(12) United States Patent
Monson

(10) Patent No.: US 6,840,704 B1
(45) Date of Patent: Jan. 11, 2005

(54) QUICK RELEASE SYSTEM FOR MOTORCYCLE BACKRESTS

(76) Inventor: Brant Monson, 3875 N. Cove Dr., Provo, UT (US) 84606

( * ) Notice: Subject to any disclaimer, the term of this patent is extended or adjusted under 35 U.S.C. 154(b) by 266 days.

(21) Appl. No.: 09/771,119

(22) Filed: Jan. 26, 2001

(51) Int. Cl.⁷ .............................. F16B 21/00; B62J 1/28
(52) U.S. Cl. ........................ 403/325; 403/326; 24/656; 24/702; 280/202; 280/288.4
(58) Field of Search .................. 403/321, 322.1–322.4, 403/323–328; 24/656, 702, 652, 600.7; 411/407, 389, 382, 482; 280/202, 288.4, 304.3–304.5

(56) References Cited

U.S. PATENT DOCUMENTS

| | | | | |
|---|---|---|---|---|
| 2,126,026 A | * | 8/1938 | Munson | 403/192 |
| 2,295,021 A | * | 9/1942 | Weiss | 280/506 |
| 2,640,734 A | * | 6/1953 | Meng | 182/206 |
| 4,848,405 A | * | 7/1989 | Albrecht | 137/884 |
| 4,993,731 A | | 2/1991 | Fuller | |
| 5,667,232 A | * | 9/1997 | Gogan et al. | 280/202 |
| 6,347,804 B1 | * | 2/2002 | Seibel | 280/288.4 |
| 6,431,785 B1 | * | 8/2002 | Melander | 403/322.1 |

* cited by examiner

Primary Examiner—David Bagnell
Assistant Examiner—Giovanna Collins
(74) Attorney, Agent, or Firm—Bateman IP Law Group

(57) ABSTRACT

A quick release system for mounting a backrest to a motorcycle includes a side bracket plate with a pair of notches which are configured to receive and hold bolt heads attached to the motorcycle. Disposed adjacent one of the notches is a retaining mechanism to prevent the bolt head from being withdrawn from the notch unless the retaining mechanism is moved by the user.

19 Claims, 9 Drawing Sheets

QUICK RELEASE SYSTEM FOR MOTORCYCLE BACKRESTS

BACKGROUND OF THE INVENTION

1. Field of the Invention

The present invention relates to a quick release system for releasably mounting a backrest on a motorcycle. More particularly, the present invention relates to a quick release mechanism for a backrest, commonly referred to as a "sissy bar", used for Harley Davidson motorcycles and the like, which allows the backrest to be readily attached and removed without leaving obvious attachment mechanisms visible on the motorcycle.

2. State of the Art

Most Harley Davidson motorcycles have seats which lack backrests. While the seat will generally accommodate more than one person, the second rider often feels more secure if there is a backrest which the rider and hang onto when cornering and which will prevent him or her from falling off the back of the motorcycle if the motorcycle suddenly accelerates. Such backrests are commonly referred to as "sissy bars."

As the common terminology suggests, many people do not like to have "sissy bars" mounted on their motorcycles. This is both due to the negative stereotype and the fact that the backrest often looks out of place on the motorcycle.

Most available backrests, however, are bolted onto the rear tender bar of the motorcycle. These backrests can take considerable time and effort to remove and reinstall. Thus, many people who utilize such back rests will leave the back rests on the motorcycle for prolonged periods of time. This is so even though the rider of the motorcycle would prefer not to have the backrest visible when a passenger is not riding on the motorcycle.

Because such back rests are beneficial and there is the desire of many riders not to have them attached for long periods of time, the industry has produced backrests which can be removed without removing the mounting bolts. For example, U.S. Pat. No. 4,993,731 shows a backrest which may be attached to the motorcycle and locked into place when in use. When not in use, the backrest can be relatively quickly detached and removed from the motorcycle.

One common disadvantage with currently available removable back rests is that they have an appearance which many find to be unappealing—knobs or bolts stick out from the rear fender bar of the motorcycle. Additionally, in some embodiments, when the back rests is removed from the motorcycle, the hardware which the back rest attaches to is left on the motorcycle providing a look which many find unappealing. Additionally, many removable back rests do not securely engage the motorcycle and tend to rattle when the motorcycle is idling or being operated.

Finally, a common problem with many quick release back rests is that they can take considerable effort to remove from the motorcycle despite being "quick release." They may require a key or other tool, or otherwise be difficult to use.

Thus, there is a need for an improved quick release system for motorcycle backrests. Such a quick release system for motorcycle backrest should be able to be mounted to the motorcycle quickly and with minimal effort on the part of the user. Such a quick release system for motorcycle backrests should also be secured on the motorcycle while in use. Additionally, such a system should be able to be removed from the motorcycle quickly and with little effort. Finally, the hardware used to attach the quick release system for motorcycle backrests should be configured so that the motorcycle looks as close as possible to the original equipment when the rider occasionally uses a detachable backrest is not readily apparent.

OBJECTS AND SUMMARY OF THE INVENTION

Thus, it is an object of the present invention to provide an improved quick release system for motorcycle backrests.

It is another object of the present invention to provide such a system which utilizes mounting hardware that does not readily suggest that a backrest is being used on the motorcycle when the back rest has been removed.

It is another object of the present invention to provide a quick release system for motorcycle backrests which securely engages the motorcycle so that the quick release backrest cannot be accidentally pulled from the motorcycle.

It is yet another object of the present invention to improve mounting a backrest on a motorcycle.

The above and other objects of the invention are accomplished by a quick release system for motorcycle backrests and method of using the same. The system includes a pair of mounting bracket plates, each of which as a channel formed therein for receiving the posts of a back rest and a pair of notches formed therein for engaging bolts on the rear fender bar of a motorcycle.

In accordance with one aspect of the present invention, the first notch extends horizontally into the side bracket plate from the proximal end of the plate, and a second notch which extends upward vertically from the bottom of the plate. The positioning of the notches allows the side bracket plates to be quickly disposed on and removed from the rear fender bar of the motorcycle with a single motion.

In accordance with another aspect of the present invention, a retaining pin loaded piston is positioned adjacent to one of the notches. As the notches are moved to engage the bolts on the motorcycle, the pin extends partially across the opening of one of the notches to hold a bolt head attached to the rear fender bar within the notch and thereby inhibit removal of the side plate from the bolt.

In accordance with another aspect of the present invention, the pin is attached to a locking mechanism which selectively prevents movement of the retaining pin and thereby prevents the bolt head from being accidentally withdrawn from the notch of the side bracket plate.

In accordance with another aspect of the present invention, the bolt head configured to receive the side plate, has a channel for receiving the notch which is positioned immediately behind the head of the bolt. The head of the bolt is configured to appear substantially the same as the bolts which commonly are used on the motorcycle when a backrest is not used. Thus, the side bracket plates of the quick release system for motorcycle backrest may be removed from the motorcycle without leaving a noticeable indication that a quick release backrest has been used.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims. It is also to be understood that each embodiment may not accomplish each object of the invention, but provides one of more advantages over the prior art.

Figure 1:
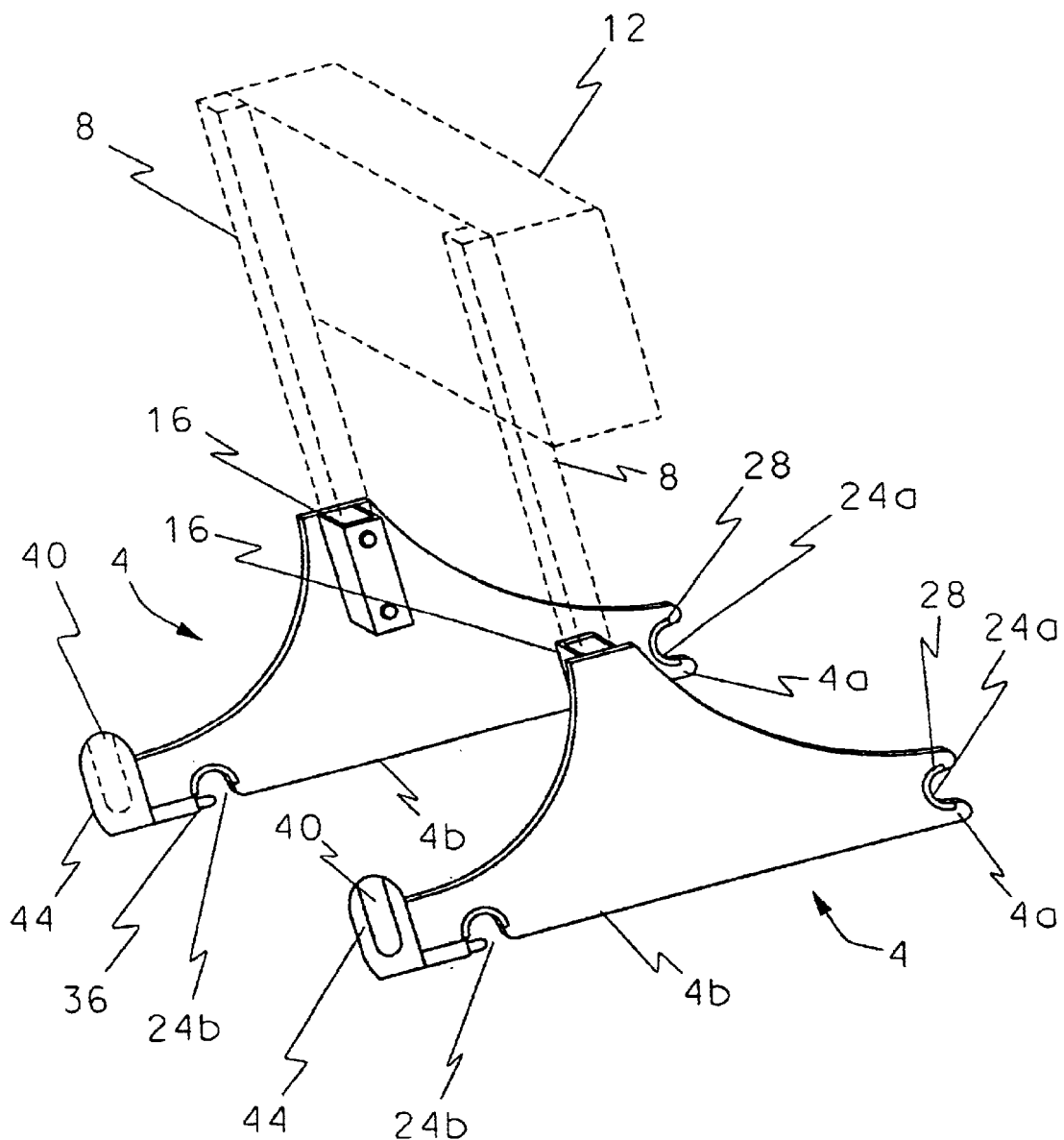
FIG. 1 shows a perspective view of a pair of side bracket plates for connecting a backrest to a motorcycle which are formed in accordance with the principles of the present invention.

Referring to FIG. 1, there is shown a perspective view of a pair of side bracket plates, generally indicated at 4 which form a quick release backrest system formed in accordance with the principles of the present invention. The backrest includes a pair of uprights 8, and a back support 12, positioned at one end of the uprights.

The opposing ends of the uprights 8, are nested in a channel 16, formed in the side bracket plates 4. Side bracket plates 4 have a pair of notches 24(a) and 24(b) which are used to secure the side bracket plates 4 to the rear fender bar (not shown in FIG. 1) of a motorcycle.

A forward notch 24a is disposed in the front end 4a of the side bracket plate 4 so that it extends into the side bracket plate generally horizontally. The second, rearward notch 24b is positioned In the side plate extending generally vertically and upwardly from the bottom 4b of the side bracket plate 4. For reasons which will be discussed in additional detail below, it is advantageous to have one notch extending into the side bracket plates 4 horizontally and the other generally vertically. While FIG. 1 shows the forward notch 24a extending horizontally into the side bracket plate 4, and the rear notch 24b extending vertically into the side bracket plate, the two could be reversed if desired.

Preferably, the front notch 24a has a semi-circular grommet 28 disposed therein. As will be explained more fully below, to attach the side plate to the motorcycle, the forward notch 24a, is slid into engagement with a generally annular channel in a bolt which is anchored in the rear fender bar of the motorcycle. The grommet 28 is configured to fit between the bolt head and the side bracket plate and significantly reduces rattling caused by vibration of the motorcycle.

Once the forward notch 24a has engaged the bolt head, the side bracket plate 4 is rotated downwardly until the rearward second notch 24b slides into engagement with an annular channel in a second bolt disposed rearwardly on the rear fender bar of the motorcycle from the first bolt. As with the first bolt, the second bolt's an annular channel is preferably sized to snuggly receive a semi-circular grommet 32 nested in the channel 24b.

Disposed adjacent the notch is a retaining means in the form of a pin 36. Attached to the pin 36 is a handle 40. The handle 40 may include a channel 44 to facilitate easy grasping between the user's thumb and forefinger. The handle 40 also preferably includes a slot on the forward side 40a so that the end of the rear end of the side bracket plate 4 remains in the handle. This prevents the user from catching a finger or clothing between the handle 40 and the rear end of the side bracket plate 4.

Figure 1A:
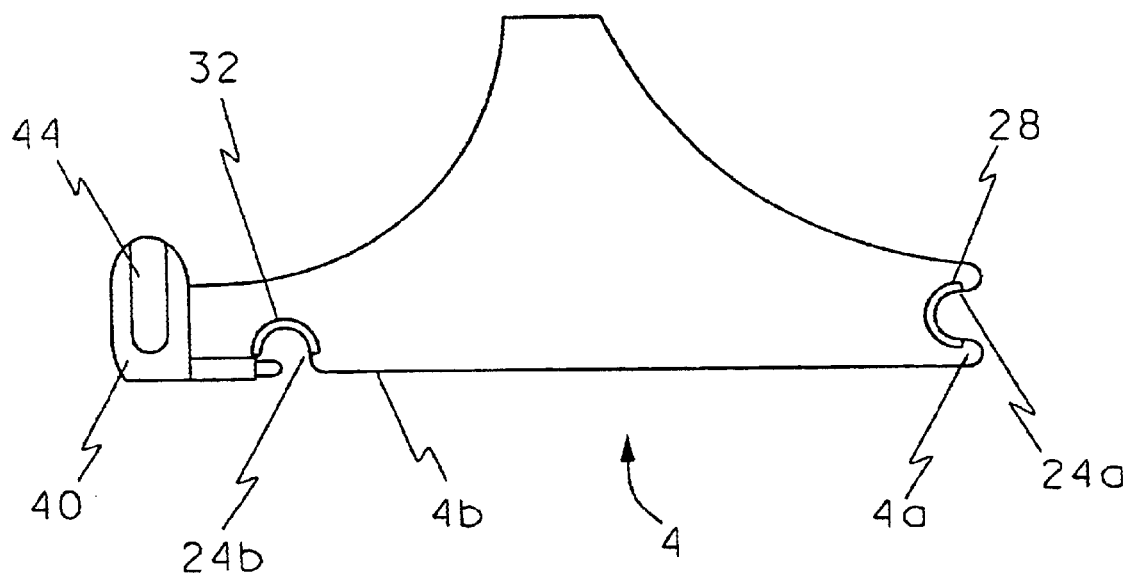
FIG. 1A shows a side view of one of the side bracket plate shown in FIG. 1, with the retaining pin withdrawn into a second position to allow mounting of the side bracket plate on a motorcycle.

By pulling rearwardly on the handle 40, the pin 36 can be moved from a first position, wherein the pin 36 obstructs the opening 24b' of the notch 24b (shown in FIG. 1), and a second position (shown in FIG. 1A), wherein the pin has been moved away from the opening of the notch.

Figure 1B:
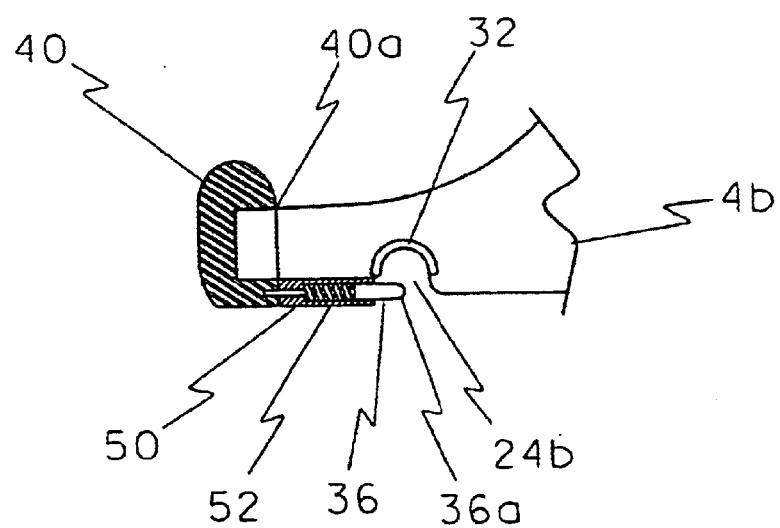
FIG. 1B shows a close-up, cross-sectional view of the rear portion of the side bracket plate shown in FIGS. 1 and 1A.

To place the head of the bolt in the notch 24b, the pin 36 is moved out of the way of the opening. As shown in FIG. 1B, this is typically accomplished by spring loading the pin 36. The spring 50 is disposed in a channel 52 which also carries the pin 36, and is used to bias the pin 36 into the first, closed position. As soon as the user releases the handle 40, the spring 50 forces the handle 40 and pin 36 to return to the original position, and the notch 24b is retained about the bolt. With the pin 36 preventing movement of the bolt head from the notch 24b, the bolt in the first notch 24a cannot be removed. Thus, the side bracket plates 4 are held to the motorcycle.

In accordance with one aspect of the invention, the pin 36 may be positioned so that it covers approximately one-half the opening when in the first position and is rounded on the end 36a. In such an orientation, the pin 36 will automatically slide out of the way as it engages the bolt. This is due both to the position of the pin 36, and the engagement between the rounded end of the pin 36 and the rounded head of the bolt. This can be further facilitated by sloping the sides of the opening 24b' of the notch 24b as shown in FIG. 1B.

Once the pin 36 has been advanced beyond the center of the bolt head, the pin 36 slides back into the first position and prevents accidental removal of the side bracket plates from the motorcycle's rear fender bar.

Those familiar with the quick release mechanisms of the prior art will appreciate that the quick release mechanism of the present invention consumes far lesser time and is easier to use both in attachment and replacement. To remove the side plate from the frame of the motorcycle, the user need only pull rearwardly on the handle 40 a sufficient distance to move the spring loaded pin 36 a sufficient distance that the bolt head will slide by the pin. The side bracket plate 4 can then be rotated upwardly and the bolt removed from the rear notch 24b. The side bracket plates 4 are then pulled rearwardly and the entire sissy bar can be removed from the motorcycle.

Those skilled in the art will appreciate that the functioning of the retaining mechanism, including the handle 40 and the spring loaded pin 36, can be affected by the length of the spring loaded piston. For example, if the spring loaded pin extends only about half way across the notch 24b, the side plate can be made to engage the motorcycle without the necessity of pulling the handle 40 rearwardly as mentioned above. Such a configuration is extremely easy to put on as only end is necessary because the handle 40 on each side need not be pulled back. However, such an engagement increases the perception that the spring loaded piston may engage the bottom side of the bolt during sudden braking situations and cause the spring loaded piston to retract and allow the side plate to release engagement from the bolt. By using a longer pin 36, or a pin which is beveled on the lower side, the risk of such accidental release can be eliminated. However, a longer pin 36 will generally require that the user use both hands to pull back the handles 40 and withdraw the spring loaded pin.

Figure 2B:
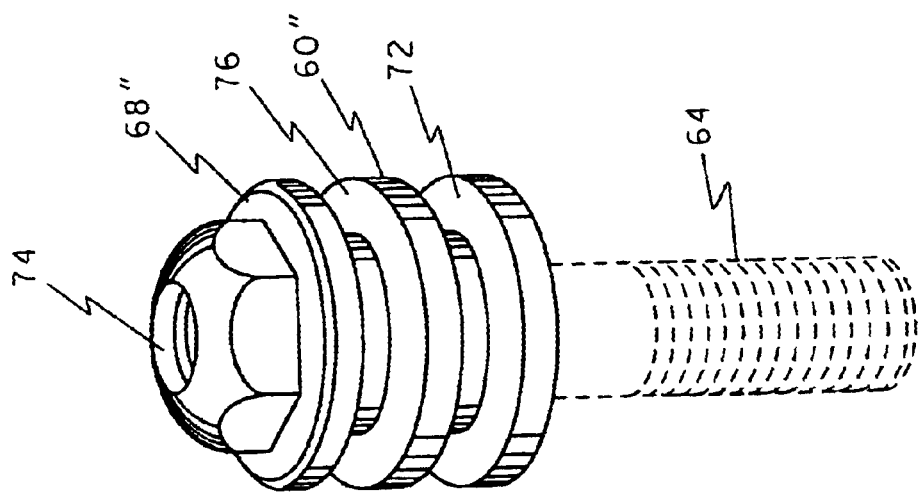
FIG. 2B shows a perspective view of another embodiment of a bolt which is configured to receive a side bracket plate and to secure the side bracket plate to the rear fender bar of a motorcycle.
Figure 2A:
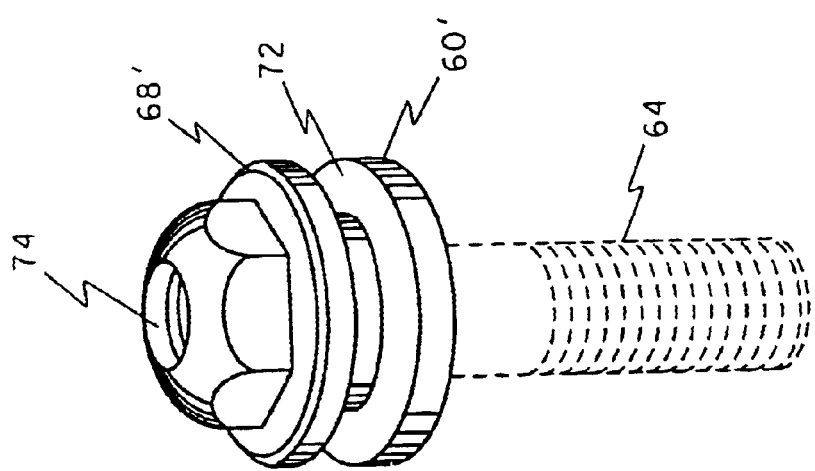
FIG. 2A shows a perspective view of an alternate embodiment of a bolt which is configured to receive a side bracket plate and to secure the side bracket plate to the rear fender bar of a motorcycle.
Figure 2:
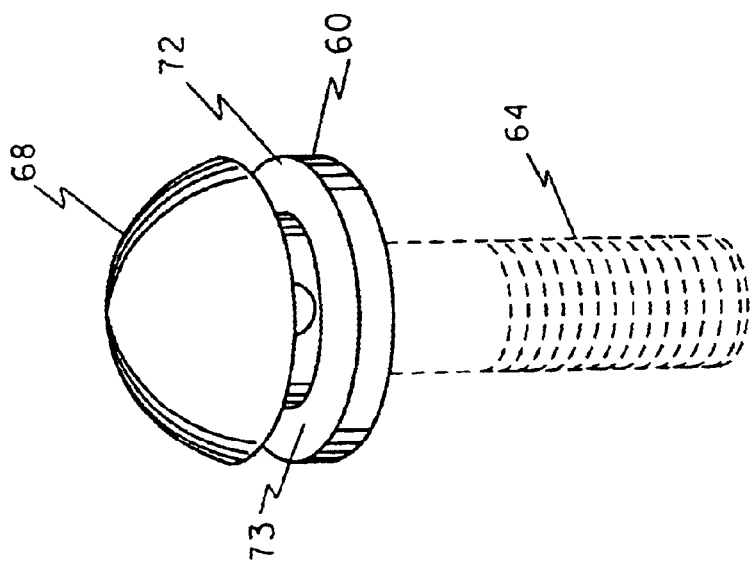
FIG. 2 shows a perspective view of a bolt which is configured to receive a side bracket plate and to secure the side bracket plate to the rear fender bar of a motorcycle.

Turning now to FIGS. 2, 2A and 2B, there are shown perspective views of three embodiments of a bolt 60, 60' and 60" which can be used in accordance with the principles of the present invention. Each bolt 60, 60' and 60" has a threaded shaft 64 for engaging the rear fender bar. The shaft 64 is shown in shadow on each bolt 64 to more clearly emphasize the portion of the bolt which is visible when mounted on the rear fender bar of the motorcycle.

Disposed at an end of the shaft 64 opposite the threads is a head 68, 68' and 68". The heads 68, 68' and 68" are configured to appear similar to rounded bolt heads which are typically present on the rear fender bars of motorcycles. Unlike the conventional bolt, however, the bolt 60, 60' and 60" has at least one annular channel 72 which is configured to receive the portion of the side bracket plate 4 define the notch 24a or 24b and the associated grommet 28 or 32.

While the annular channel 72 is sufficient to allow attachment of the side bracket plates 4, they are sufficiently thin that they appear substantially the same as the bolts which are original equipment on the rear fender bar of the motorcycle. Thus, once the side bracket plates 4 are removed from the bolts, there is virtually no indication that a sissy bar is being used on the motorcycle. Even when the side plate is on the motorcycle, the amount added to the profile of the motorcycle is very minimal and more aesthetically pleasing.

The bolt 60 in FIG. 2 also has a small hole 73 for receiving a wrench to tighten the bolt on the rear fender bar. Additionally, the bolts 60, 60' and 60" can be used to mount other structures, such as saddle bags. Thus, bolt 60' also enclosed a female threaded portion 74 for receiving another bolt. Bolt 60" includes the female threaded portion 74, and further includes a second annular channel 76 which can be used for mounting saddle bags at the same time as the side bracket plates 4.

Figure 2C:
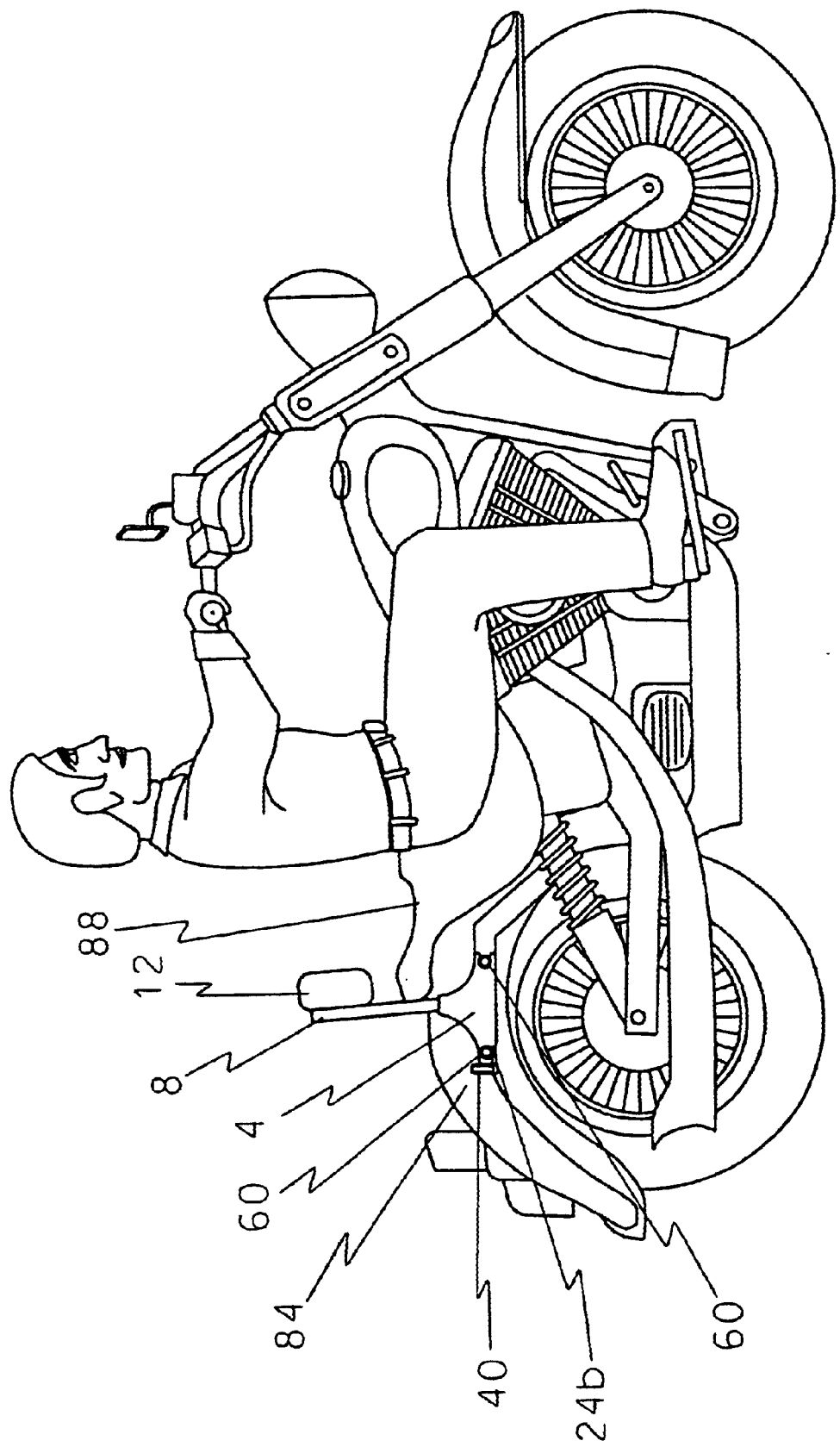
FIG. 2C shows a side view of a motorcycle having a back rest and side bracket plates mounted thereon in accordance with the present invention.

Turning now to FIG. 2C, there is shown a side view of a motorcycle 80 with a quick release backrest system attached thereto in accordance with the principles of the present invention. The side bracket plates 4 are mounted onto the bolts 60 which are anchored in the rear fender bar 84. With the side bracket plates 4 securely mounted to the rear fender bar, the backrest 12 is held behind the second seat 88 with sufficient rigidity that a person riding on the second set can lean against or hold onto the backrest.

Figure 2D:
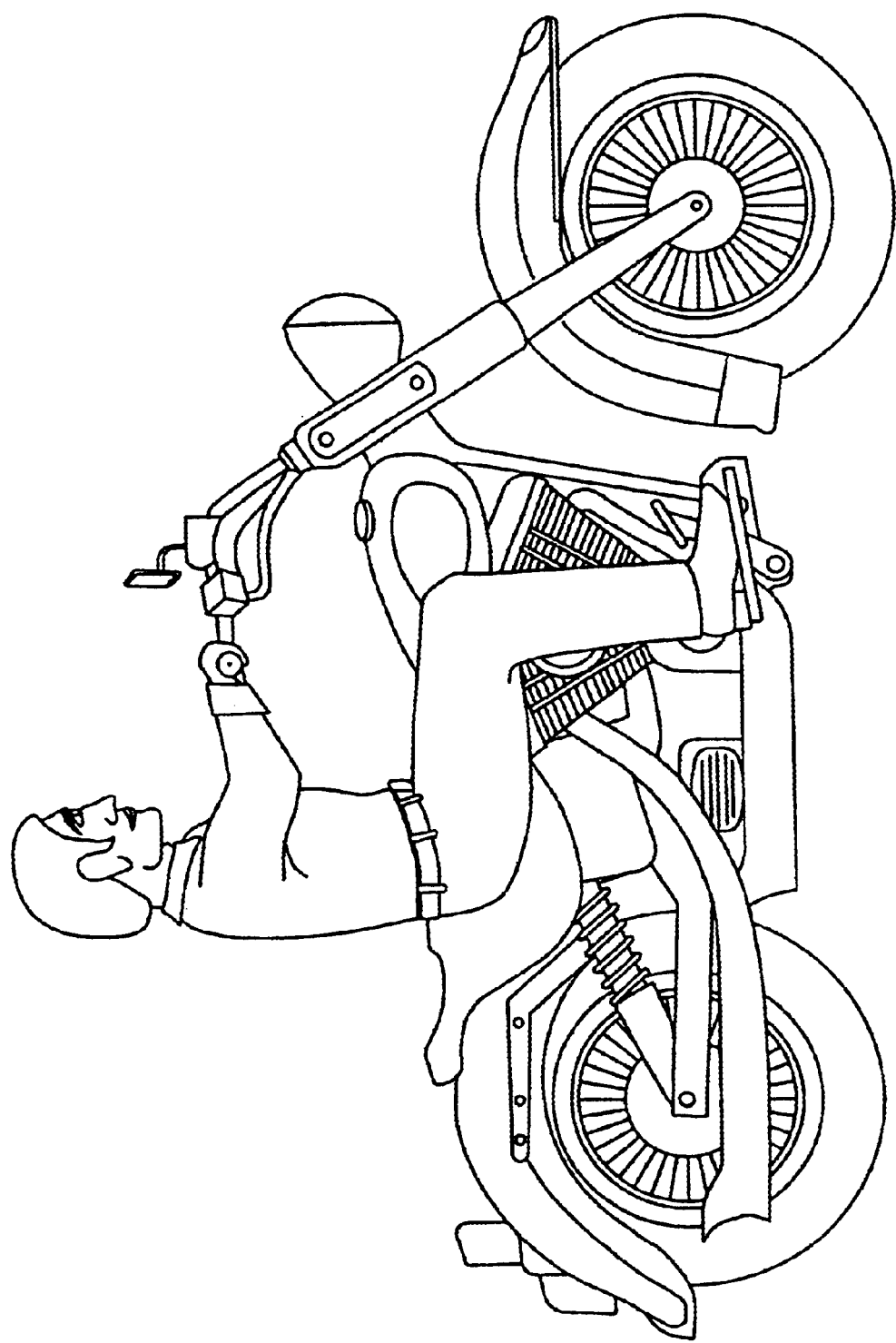
FIG. 2D shows a side view of the motorcycle of FIG. 2B with the side bracket plates removed.

To remove the backrest 12, the user need merely pull rearwardly on the handle 40 on each side, and then rotate the side bracket plate 4 upwardly until the bolt 60 is no longer in the notch 24b. The backrest 12 and side bracket plates 4 can then be stored until they are needed again. With the "sissy bar" removed, the motorcycle looks substantially identical to a motorcycle which has never used a sissy bar, as shown in FIG. 2D. To see the annular channels in the bolts 60, one must be very close. Even if the annular channels can be seen, however, it does not significantly change the appearance of the motorcycle.

Figure 3:
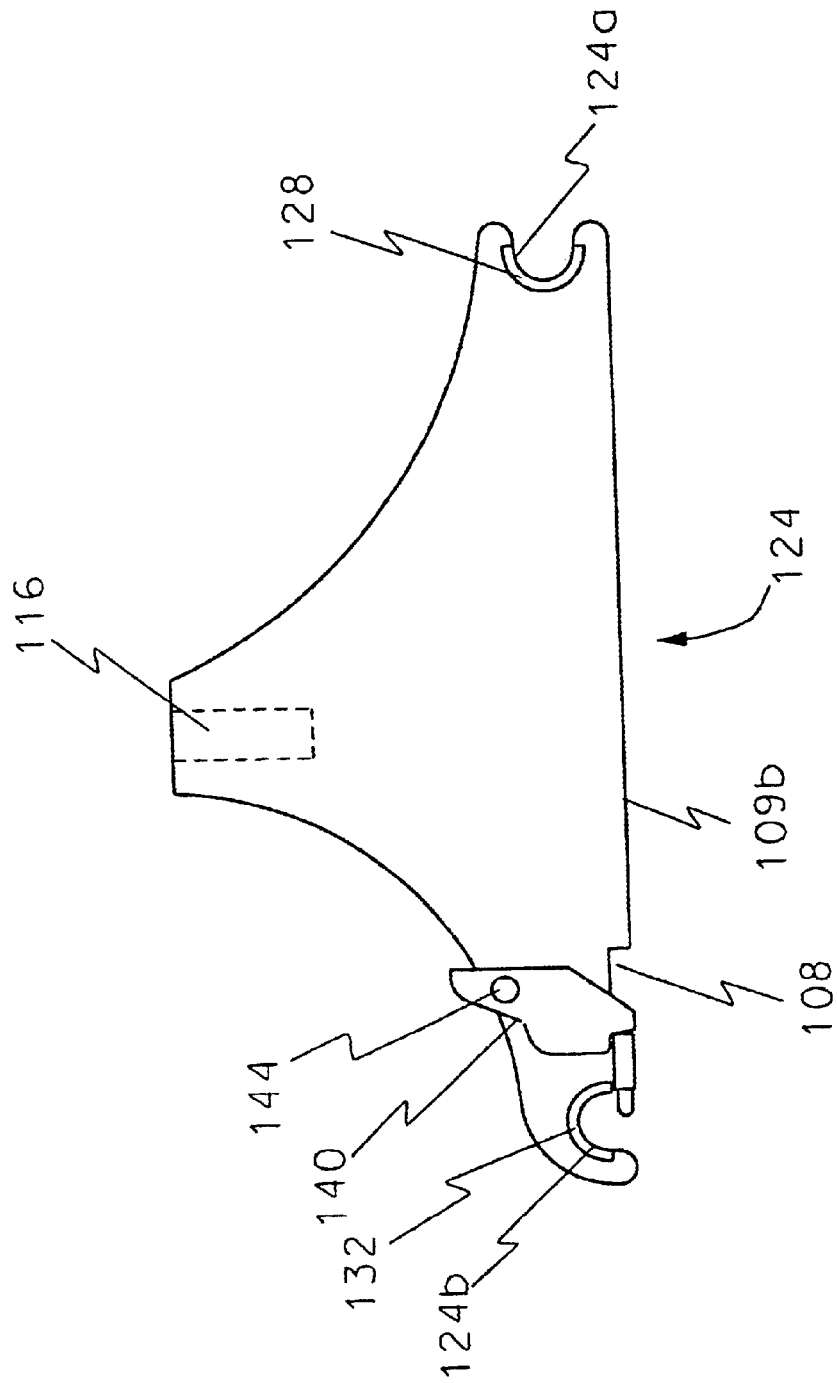
FIG. 3 shows a side view of a side bracket plate made in accordance with an alternate embodiment of the present invention.

Turning now to FIG. 3, there is shown a side view of another embodiment of a side bracket plate, generally indicated at 104, made in accordance with the principles of the present invention. The side bracket pate 104 has a first, forward notch 124a and a second, rearward notch 124b which are configured to receive bolts on a rear fender bar of a motorcycle as discussed with the prior embodiment. Each notch 124a and 124b also preferably has a grommet 28 and 32, respectively, for minimizing vibration.

Disposed adjacent the second, rear notch 124b is a slidable pin 136 which selectively prevents a bolt head from being advanced into or removed from the notch. The slidable pin 136 is attached to a handle 140 which slides along the rear portion of the side bracket plate 104. As shown in FIG. 3, the side bracket plate 104 may have a channel 108 in the bottom side 104b to facilitate sliding of the handle 140. The Handle 140 and slidable pin 136 are preferably spring loaded so that the pin is biased into a first, closed position.

Disposed on the handle is a knob 144 which is attached to a locking pin (not shown in FIG. 3). As will be explained in additional detail with respect to FIGS. 3A and 3B, the locking pin prevents accidental movement of the handle 140 and thereby prevents the side bracket plate 104 from being accidentally removed from the bolt heads.

Figure 3A:
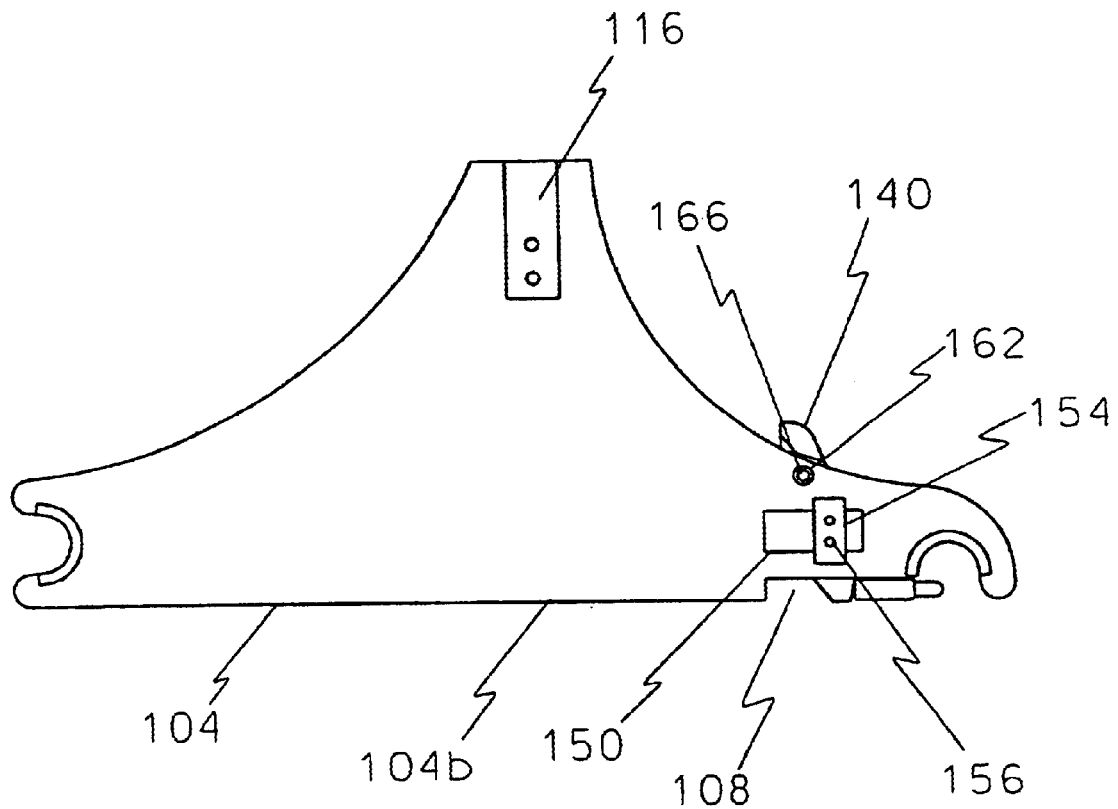
FIG. 3A shows a side view of the opposing side of the side bracket plate shown in FIG. 3.

Turning to FIG. 3A, there is shown a side view of the opposing side of the side bracket plate 104 from that shown in FIG. 3. The inner side 104c of the side bracket plate 1044 has the channel 116 for receiving the uprights (not shown)

Adjacent the rear notch 124b and channel 108 in the bottom 104b of the side bracket plate 104 is a guide channel 150 formed in the side bracket plate. A slide 154 is typically attached to the handle 140 by one or more fasteners 156 which extend through the guide channel 150. The guide channel 150 allows the handle to slide along the rear portion of the side bracket plate 104 to slide the pin 136 between the first, closed position, and the second, open position, wherein the bolt head can be moved into and cut of the notch 124b.

Those skilled in the art will appreciate numerous modifications which could be made to the handle and related mechanisms. For example, the same functionality could be provided by having the handle extend over both sides of the plate.

Positioned adjacent to the guide channel 150 is a locking hole 162. The locking hole 162 is configured to receive a locking pin 166 which is attached to the knob 144 in FIG. 3. Preferably the locking pin 166 is spring loaded so that when it is positioned over the locking hole 160, the locking pin 166 will advance into the hole.

When the locking pin 166 is positioned in the locking hole 160, the handle 140 is unable to move along the rear portion of the side bracket plate 104 and the retaining pin 136 is held in the first, closed position. To move the handle 140, the knob 144 need only be pulled away from the side bracket plate 104 to move the locking pin 166 out of the locking hole 160.

Figure 3B:
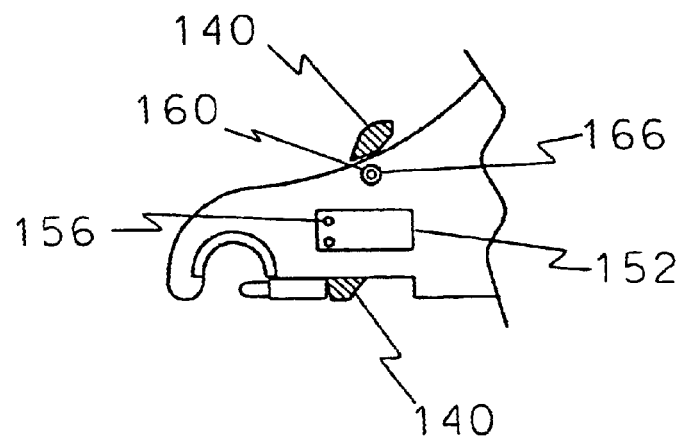
FIG. 3B shows a cross-sectional view of the rear portion of the embodiment shown in FIGS. 3 and 3A.

Turning now to FIG. 3B, there is shown a cross-sectional view of the handle 140, locking pin 166 and fastener 156 taken along the plane of the side bracket plate 104. Once the locking pin 166 is moved out of the locking hole 160, the movement of the handle 140 is limited by either the fasteners in the guide channel 152, the end of the channel 108, or the configuration of the pin 136. If the pin 136 is spring loaded, the releasing the handle 140 will return the configuration to a locking position as shown in FIGS. 3A and 3B. Those skilled in the art will appreciate that a spring could be placed along the guide channel 152 or the channel 108 in leu of having the pin 136 spring loaded directly.

Figure 4:
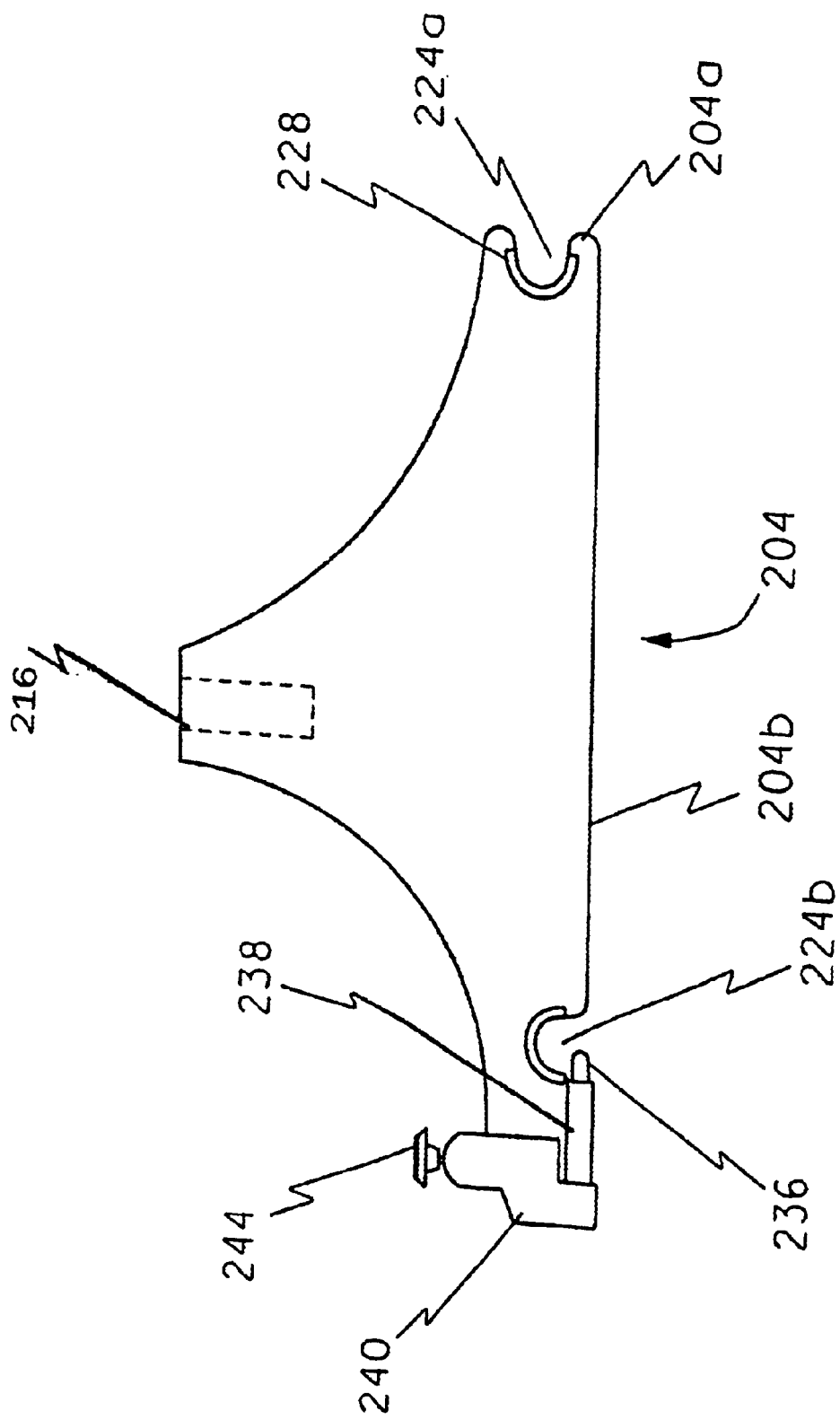
FIG. 4 shows a side view of yet another embodiment of the present invention.

Turning now to FIG. 4, there is shown a side view of yet another embodiment of a side bracket plate, generally indicated at 204, made in accordance with the principles of the present invention. The side plate includes a channel 216 for receiving the uprights of a backrest similar to the embodiments previously discussed. The side bracket plate 204 also includes a first, forward notch 224a which extends inwardly generally horizontally from the front end 204a of the side bracket plate, and a second, rear notch 224b which extends upwardly in a vertical orientation from the bottom 204b near the rear end of the side bracket plate. The rear notch 224b is preferably beveled to facilitate entry of a bolt head into the notch. Additionally, each notch 224 preferably has a semi-circular grommet, 228 and 232 respectively, for nesting between the wall defining the notch 224 and the bolt head.

The opening to the rear notch 224b is selectively occluded, or functionally closed, by a pin 236 mounted in a cylinder 238 on the bottom 204b of the side bracket plate 204. As with the other embodiments, the pin 236 is actuated by moving a handle 240 and is preferably spring loaded to return the pin to the closed position.

As shown in FIG. 4, the handle 240 has a knob 244 disposed thereon. As will be explained in additional detail in FIG. 4A, pulling the knob 244 upwardly allows the handle 240 to move away from the, notch 224b and thereby move the pin 236 into a second, open position wherein a bolt head can be slid into or out of the notch. Thus the knob 244 forms part of a locking mechanism which prevents accidental removal of the side plate.

Figure 4A:
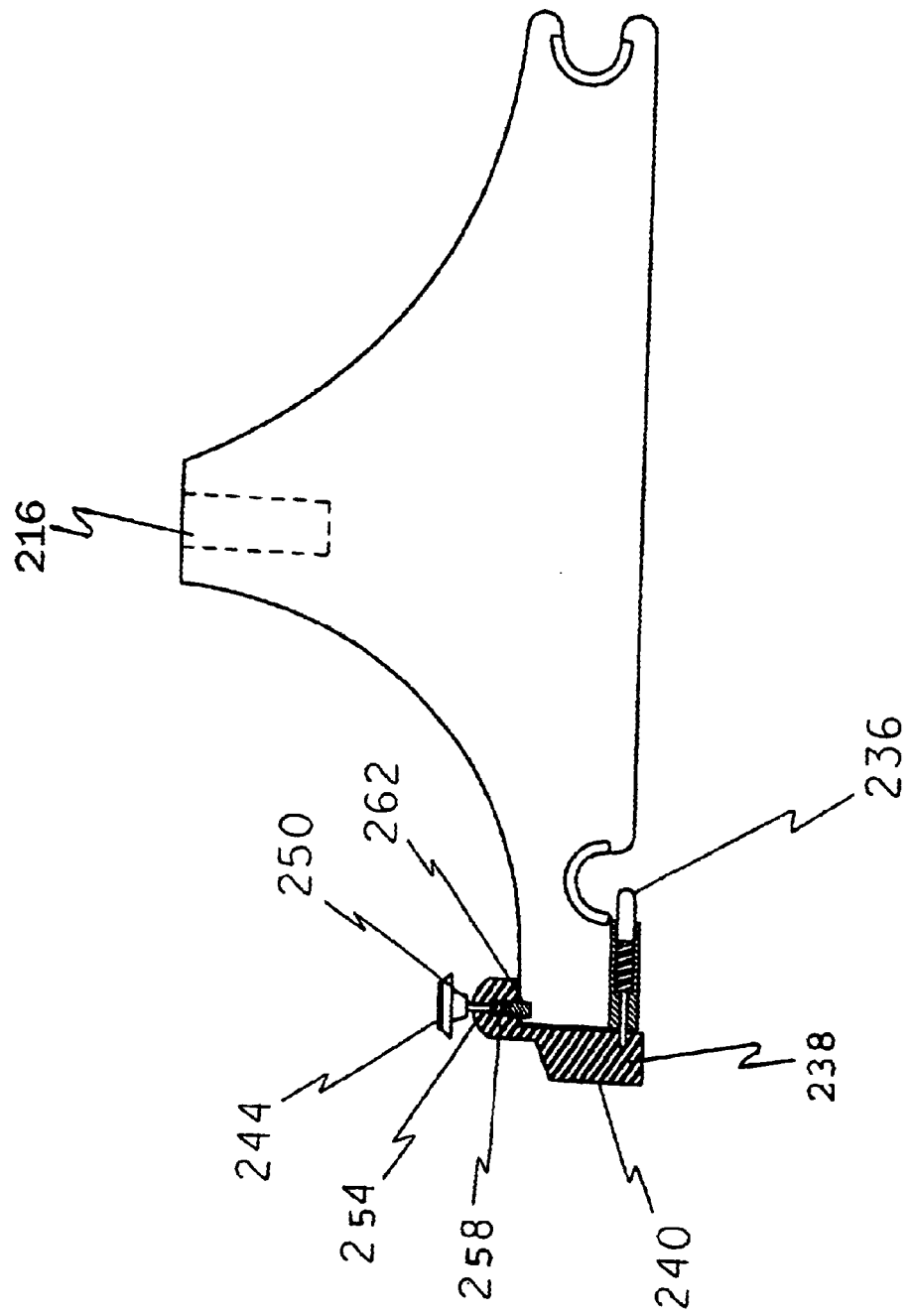
FIG. 4A shows a cross-sectional view of FIG. 4.

FIG. 4A shows a cross-sectional view of the handle 240 and associated parts. The handle 240 has a void 250 in which a locking pin 254 moves responsive to movement of the knob 244. The locking pin 254 is preferably biased downward by a spring 258 into contact with the side bracket plate 204. When the locking pin 254 is in alignment with a locking notch 262 in the side bracket plate 204 and biased downwardly, the locking pin 154 will prevent movement of the handle 240 away from the notch 224b. Thus, when the locking pin 254 is nested in the notch 262 in the side bracket plate 204, the retaining pin 236 cannot be moved.

By lifting the knob 244, the pin 254 car be moved out of the locking notch 262 and the handle moved to move the pin 236 into the second, open position. Once the handle 240 is released, the spring 238 associated with the retaining pin 236 will move the handle 240 back to its original position, allowing spring 258 to force the locking pin 254 into the locking notch 262.

Thus there is disclosed an improved quick release system for mounting backrests to motorcycles. Those skilled in the art will appreciate numerous modifications which can be made without departing from the scope and spirit of the present invention. The appended claims are intended to cover such modifications.

What is claimed is:

1. A quick release system for mounting a back rest on a motorcycle, the system comprising:

a side bracket plate having a first notch extending inwardly generally horizontally from an end of the side bracket plate, and a second notch extending generally upwardly into the side bracket plate from a bottom thereof, the first and second notches being configured to receive a bolt head, a linearly slidable retaining means mounted to the side bracket plate for selectively allowing movement of a bolt head into the second notch, wherein the slidable retaining means comprises a retaining pin slidable between a first position, wherein the pin prevents movement of a bolt head out of the second notch, and a second position, wherein the retaining pin does not prevent movement of a bolt head out of the second notch;

a handle attached to the retaining pin such that movement of the handle away from the second notch moves the retaining pin from the first position to the second position; and further comprising a locking means, wherein the locking means comprises a locking pin.

2. The quick release system according claim 1, further comprising at least one semi-circular grommet disposed along one of the notches.

3. The quick release system according to claim 1, wherein the retaining pin is biased into the first position.

4. The quick release system according to claim 1, wherein the side bracket plate has a locking notch and wherein the locking pin extends into the locking notch to prevent movement of the handle away from the second notch.

5. The quick release system according to claim 1, wherein the side bracket plate has a locking notch and wherein the locking pin extends into the locking notch to prevent movement of the handle away from the second notch.

6. The quick release system according to claim 1, wherein the side bracket plate further comprises a guide channel formed therein, and wherein the handle slides along the guide channel.

7. The quick release system according to claim 1, wherein the side bracket plate further comprises a guide channel formed therein, and wherein the handle slides along the guide channel.

8. The quick release system according to claim 1, further comprising locking means for selectively preventing movement of the slidable retaining means.

9. The quick release system according to claim 1, wherein the side bracket plate has a locking hole and wherein the locking pin extends into the locking hole to prevent movement of the retaining means.

10. The quick release system according to claim 1, wherein the side bracket plate has a locking notch and wherein the locking pin extends into the locking notch to prevent movement of the slidable retaining means away from the second notch.

11. The quick release system according to claim 1, wherein the locking pin is spring loaded to bias the locking pin into a locking position.

12. The quick release system according to claim 1, wherein the system further comprises at least one bolt, the bolt having a bolt head with a generally annular channel formed therein, the bolt head being configured for nesting in the second notch.

13. The quick release system according to claim 12, wherein the system comprises two bolts each having a generally annular channel formed therein and each being configured for nesting in one of the first and second notches.

14. The quick release system according to claim 12, wherein the bolt head further comprises a second annular channel.

15. The quick release system according to claim 12, wherein the bolt head further comprises female threaded portion.

16. A quick release system for mounting a backrest on a motorcycle, the system comprising:

a side bracket plate having a first, forward notch extending inwardly generally horizontally from a front end of the side bracket plate, and a second notch disposed adjacent a back end of the side bracket, extending generally upwardly into the side bracket plate from a bottom thereof, the first and second notches being configured to receive a bolt head;

a slidable retaining pin mounted to the side bracket plate, rearwardly from the second notch from selectively allowing movement of a bolt head into the second notch, the slidable retaining pin being movable between a first, forward position wherein the slidable retaining pin prevents advancement of a bolt head into the our of the notch, and a second position wherein the retaining pin allows movement of the bolt head into or out of the notch, and wherein the retaining pin is biased into the first position;

further comprising a locking member for selectively preventing movement of the slidable retaining pin into the second position, wherein the slidable retaining pin is attached to a handle and wherein the locking member is disposed in the handle.

17. The quick release system for mounting a backrest according to claim 16, wherein a locking notch is disposed in the side bracket plate and wherein the locking member is biased to extend into the locking notch.

18. The quick release system for mounting a backrest according to claim 16, wherein the locking member moves perpendicular to the slidable retaining pin.

19. The quick release system for mounting a backrest according to claim 16, further comprising a handle which slides along the side bracket plate.

\* \* \* \* \*